United States Patent Office 3,208,971
Patented Sept. 28, 1965

3,208,971
BIS-SILYL UREAS AND COPOLYMERS THEREOF
John W. Gilkey and Robert H. Krahnke, Midland, Mich., assignors to Dow Corning Corporation, Midland, Mich., a corporation of Michigan
No Drawing. Filed June 4, 1962, Ser. No. 199,614
7 Claims. (Cl. 260—46.5)

This invention relates to organosilicon ureas having two silicon atoms per urea nucleus.

It is the object of this invention to prepare novel compositions of matter which are useful in the formation of copolymers with aminoplast resins and which are useful at adhesives, coating compositions, bonding agents and for the production of durable water repellent finishes on cellulosic fabrics.

This invention relates to organosilicon compounds of the formula $$(R''O)_{3-y}\underset{\underset{R'_y}{|}}{Si}-R\underset{\underset{Z}{|}}{N}-\underset{\underset{O}{\|}}{C}-\underset{\underset{Z}{|}}{N}R\underset{\underset{R'_y}{|}}{Si}(OR'')_{3-y}$$

in which R'' is of the group alkyl radicals and acyl radicals of from 1 to 4 inclusive carbon atoms and radicals of the formula —(CH$_2$CH$_2$O)$_n$R''' in which $n$ is 1 to 2 inclusive and R''' is an alkyl radical of from 1 to 4 inclusive carbon atoms, R' is a monovalent hydrocarbon radical of less than 7 carbon atoms, $y$ has an average value from 0 to 3 inclusive, and R is a divalent hydrocarbon radical free of aliphatic unsaturation and having from 1 to 18 carbon atoms which is attached to the N nitrogen atom of the urea nucleus through a nonaromatic carbon atom, and Z is hydrogen or a lower alkyl radical.

The compositions of this invention are best prepared by reacting silylamines of the formula $$(R''O)_{3-y}\underset{\underset{R'_y}{|}}{Si}R\underset{\underset{Z}{|}}{N}H$$

with urea by heating a mixture of the two in proportion of at least two mols of silane per mol of urea. The reaction proceeds upon heating the mixture at temperatures above 125° C. with the elimination of two mols of ammonia per mol of urea. In carrying out the reaction it is often desirable, but not essential to employ solvent such as alcohols, such as methanol, ethanol, or isopropanol; or hydrocarbons such as xylene or the like. The use of a solvent is particularly desirable when the reaction mixture is quite viscous.

The starting amines of the formula $$(R''O)_{3-y}\underset{\underset{R'_y}{|}}{Si}-R\underset{\underset{Z}{|}}{N}H$$

are known organosilicon compounds and they can be prepared either by reacting an unsaturated amine with a silane containing an SiH group or by reacting ammonia or an alkyl amine with silanes of the formula $$(R''O)_{3-y}\underset{\underset{R'_y}{|}}{Si}RCl$$

This invention also relates to siloxanes in which at least one siloxane unit is of the formula $$O_{\frac{3-y}{2}}\underset{\underset{R'_y}{|}}{Si}-R\underset{\underset{Z}{|}}{N}-\underset{\underset{O}{\|}}{C}-\underset{\underset{Z}{|}}{N}RSiO_{\frac{3-y}{2}}$$

in which $y$ has an average value from 0 to 2 inclusive, R' is a monovalent hydrocarbon radical of less than 7 carbon atoms, R is a divalent hydrocarbon radical free of aliphatic unsaturation and having from 1 to 18 inclusive carbon atoms and which is attached to the N atom through a nonaromatic carbon atom and Z is hydrogen or a lower alkyl radical, any remaining siloxane units being of the formula $$B_aSiO_{\frac{4-a}{2}}$$

in which $a$ has a value of 0 to 3 inclusive and B is selected from the group hydrogen, monovalent hydrocarbon radicals, and monovalent halohydrocarbon radicals, both having from 1 to 18 carbon atoms.

The siloxanes of this invention are best prepared by two methods. The first is to hydrolyze silanes of the formula $$(R''O)_{3-y}\underset{\underset{R'_y}{|}}{Si}-R\underset{\underset{Z}{|}}{N}-\underset{\underset{O}{\|}}{C}-\underset{\underset{Z}{|}}{N}RSi(OR'')_{3-y}$$

These silanes can be hydrolyzed individually to give homopolymers, or a mixture of two or more of them can be cohydrolyzed to give copolymeric siloxanes. In addition, the above silanes can be copolymerized with silanes of the formula B$_a$SiX$_{4-a}$ in which X is a hydrolyzable group, to form copolymers in which some of the silicon atoms have the urea derivative attached thereto.

A second method of preparing the copolymers of this invention involves reacting alkoxysilanes of the formula $$(R''O)_{3-y}\underset{\underset{R'_y}{|}}{Si}-R\underset{\underset{Z}{|}}{N}-\underset{\underset{O}{\|}}{C}-\underset{\underset{Z}{|}}{N}RSi(OR'')_{3-y}$$

with siloxanes containing silicon-bonded hydroxyl groups. This reaction is best carried out in the presence of a small amount of amine catalyst such as 2-ethylhexylamine or an organosilylamine. The reaction can be represented schematically by the equation $$\equiv SiOR'' + HOSi\equiv \rightarrow \equiv SiOSi\equiv + R''OH$$

For the puprose of this invention, R'' can be any alkyl radical of 1 to 4 carbon atoms such as methyl, ethyl, isopropyl, butyl or t-butyl; or any acyl radical of 1 to 4 carbon atoms such as formyl, acetyl or propionyl; or any alkoxyethyl radical such as β-methoxyethyl, β-ethoxyethyl, or β-butoxyethyl and any radical of the formula —(CH$_2$CH$_2$O)$_2$CH$_3$ or —(CH$_2$CH$_2$O)$_2$C$_4$H$_9$.

R' can be any monovalent hydrocarbon radical of less than 7 carbon atoms such as phenyl, cyclohexyl, cyclopentyl, cyclopentenyl, methyl, ethyl, hexyl, vinyl, allyl, or hexenyl.

R can be any divalent hydrocarbon radical free of aliphatic unsaturation such as —(CH$_2$)$_3$—, —(CH$_2$)$_{18}$—,

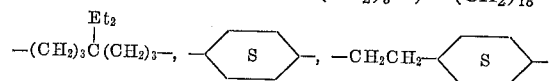, 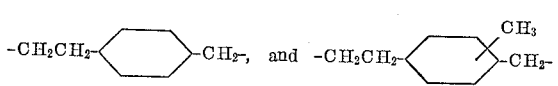

Z can be hydrogen or any lower alkyl radical such as methyl, ethyl, isopropyl or butyl.

As can be seen siloxane $$B_aSiO_{\frac{4-a}{2}}$$

can be any combination of SiO$_2$, BSiO$_{3/2}$, B$_2$SiO and B$_3$SiO$_{.5}$ units. B can be any monovalent hydrocarbon radical such as aliphatic hydrocarbon radicals such as methyl, ethyl, t-butyl, octyl, octadecyl, vinyl, allyl, hexenyl, butadienyl and ethynyl; cycloaliphatic hydrocarbon radicals such as cyclopentyl, cyclohexyl, cyclohexenyl, methylcyclohexyl and vinylcyclohexyl; aryl hydrocarbon radicals such as phenyl, tolyl, xylyl, xenyl, naphthyl and anthracyl; and aralkyl radicals such as benzyl; β-phenylethyl and β-phenylpropyl. B can also be any monovalent halohydrocarbon radical such as gamma-chloropropyl, 3,3,3-trifluoropropyl, chloromethyl, bromocyclohexyl, trifluorovinyl, bromocyclohexenyl, pentachlorophenyl, bromoxenyl, α,α,α-trifluorotolyl, chloronaphthyl and chloroanthracyl.

As pointed out above, the compositions of this invention are useful as adhesives, coatings and as sizing agents for siliceous materials. That is the application of the compositions of this invention to a siliceous material improves the bond between the siliceous material and organic resins, particularly aminoplast resins. In addition, the organosilicon compounds of this invention can be copolymerized with aminoplast resins to form compositions suitable as coatings and as bonding agents.

One of the particularly outstanding uses of the composition of this invention is for rendering cellulosic fabrics water repellent. The particular advance is with respect to the durability of the water repellency as shown by the maintaining of this property through repeated washings at water temperatures up to 212° F. In order to accomplish this result, one applies the compositions of this invention to the cellulosic fabric and thereafter heats the treated fabric in order to cure the organosilicon compound. The compositions can be applied to the fabric in any suitable manner. One particular way is to apply them in the form of an aqueous emulsion or solution.

A composition which is particularly desirable for treating fabric is a copolymer (A) of from 2 to 50 percent by weight of siloxane of the unit formula

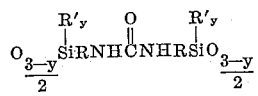

in which $y$ has an average value from 0 to 2 inclusive and $R'$ is a lower alkyl radical and from 50 to 98 percent by weight siloxane of the formula

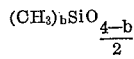

in which $b$ has an average value of from 1.75 to 2.1 inclusive.

The water repellency is further improved when copolymer (A) is employed in conjunction with at least 5 percent by weight based on the weight of the total siloxane of (B) a siloxane of the formula

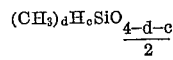

in which $d$ has an average value of from 1.75 to 2 inclusive and $c$ has an average value of from 0 to 1 inclusive.

The precise upper limit of the amount of (B) employed can be varied widely except that for best results the amount of copolymer (A) should be such that there is at least 2 percent by weight of siloxane of the formula

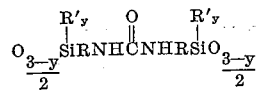

For the purpose of this invention siloxane (B) can be a homopolymeric dimethylsiloxane or a homopolymeric methylhydrogensiloxane. (B) can also be any copolymer of a methylsiloxane and a methylhydrogensiloxane which falls within the above definition. Examples of such copolymers are a copolymer of monomethylsiloxane, dimethylsiloxane and trimethylsiloxane; a copolymer of trimethylsiloxane and methylhydrogensiloxane; a copolymer of dimethylsiloxane, trimethylsiloxane, and $SiO_2$; a copolymer of $HSiO_{3/2}$ and dimethylsiloxane; a copolymer of dimethylsiloxane, $H^2SiO$ and trimethylsiloxane or a copolymer of $HMe_2SiO_{1/2}$ and methylhydrogensiloxane. Siloxane (B) can also be a mixture of any of these specific siloxanes.

For optimum results in both water repellency and durability, the siloxane of this invention should be employed in conjunction with crease resistant resins. The crease resistant resin is preferably used in amount of from 25 to 97.5 percent by weight based on the combined weights of the resin and silicones (A) and (B). Any crease resistant resin which is normally used with cellulosic fabrics, can be used in this invention. Examples of the types of crease resistant resins which are operative are resins, pyrimidone-formaldehyde resins and epoxide resins, triazine-formaldehyde resins, triazone-formaldehyde resins, pyrimidone-formaldehyde resins and epoxide resins. The commercial utilization of such resins to render fabrics crease resistant is well established and is described in many publications such as, for example, Henry Tovey, "Textile Research Journal," vol. 31, No. 3, March 1961, pp. 185–252 (printed in U.S.A.).

More specifically, examples of operative crease resistant resins are urea-formaldehyde resin of the formula

cyclicalkyleneurea-formaldehyde resins such as dimethylolethylene urea, dimethylol-1,2-propyleneurea, dimethylol-1,2-propylene thiourea, and dimethylol-1,3-propyleneurea; triazone-formaldehyde resins such as dimethylol-5-methyl-tetrahydro-s-triazone-2, and resins of the formula

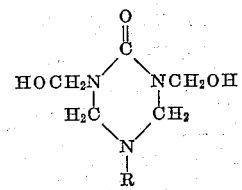

where R is an alkyl group such as methyl, ethyl, propyl, isopropyl or t-butyl; or a hydroxy alkyl group such as hydroxyethyl or hydroxypropyl; pyrimidone-formaldehyde resins such as

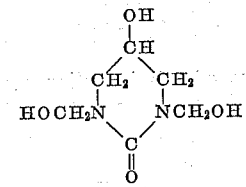

triazine formaldehyde resins such as monomethylolmelamine, dimethylolmelamine, trimethylolmelamine; and alkyl ethers of methylolmelamines such as the monomethyl ether of dimethylolmelamine, the monopropylether of trimethylolmelamine, the trimethylether of trimethylolmelamine, the monobutylether of dimethylolmelamine, and ethers of methylolmelamines and dihydric alcohols such as ethylene glycol, propylene glycol and the like; and epoxide resins such as polyglycidyl ethers of polyhydric alcohols such as the triglycidyl ether of glycerol, the diglycidyl ether of ethylene glycol, the diglycidyl ether diethylene glycol, the diglycidyl ether of dipropylene glycol and the diglycidyl ether of hexylene glycol.

The above resins can be employed alone or in combination. That is, one can employ a mixture of a triazone and a urea-formaldehyde resin, or a mixture of an alkyleneurea-formaldehyde resin and a triazone-formaldehyde resin. In addition, the resins can be either monomeric, dimeric or polymeric in structure. For best performance the resin should be water-soluble.

The water repellency of the fabrics treated with the compositions of this invention is maintained after repeated washings in hot water ranging up to 212° F. Furthermore, the compositions of this invention are not deleteriously affected by catalyst normally employed in curing crease resistance resins. These include amine-hydrochlorides, zinc nitrate and zinc fluoroborate. Therefore, emulsions containing the organosilicon compounds of this invention and crease resistant resins are stable during application in the mill and are less likely to break in the presence of crease resistant resin catalysts than emulsions of the various silicone water repellents heretofore known.

The spray rating of the treated fabric shown in the examples was determined by the AATCC standard test No. 22-1961. The water absorption and water penetration were measured by the Bundesmann tests as described in the Tentative Textile Specification No. 8 of 1955 of the British Standards Institute. The wrinkle recovery angle, which is a measure of the crease resistance of a treated fabric, was determined in accordance with AATCC tentative test method No. 66-1959T.

The following examples are illustrative only and should not be construed as limiting the invention which is properly delineated in the appended claims. In the examples the abbreviations Me, Et and Ph are used for the methyl, ethyl and phenyl radicals repsectively.

EXAMPLE 1

110.6 g. of $(EtO)_3Si(CH_2)_3NH_2$ and 15.8 g. of urea were mixed and heated in a stream of nitrogen with stirring. Ammonia evolution began at 126° C. after 25 minutes. The temperature was allowed to rise to 135° C. and maintained at that level for 7½ hours. Upon cooling, the product was a clear, pale, yellow, viscous fluid which had the formula $$(EtO)_3Si(CH_2)_3NH\overset{O}{\overset{\|}{C}}HN(CH_2)_3Si(OEt)_3$$

EXAMPLE 2

94.5 g. of $(EtO)_3Si(CH_2)_3NH_2$ was heated to 190° C. under nitrogen. 130 ml. of a solution of urea in methanol containing 138 g. of urea was added over a period of 2½ hours at a rate to maintain the temperature at 185° C. Heating was continued at 185° C. until the distilling vapors reached a temperature of 50° C. The product was a yellow fluid having the formula $$(MeO)_3Si(CH_2)_3NH\overset{O}{\overset{\|}{C}}NH(CH_2)_3Si(OMe)_3$$

The methoxysilane was formed by transesterification of the starting ethoxysilane by the methanol.

EXAMPLE 3

100 g. of

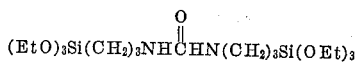

$$(MeO)_3Si(CH_2)_3\overset{Me}{\overset{|}{N}}H$$

was placed in an atmosphere of nitrogen. 160 ml. of a urea methanol solution containing 16 g. of urea was then added and the mixture heated at 184° C. for 2 hours, 15 minutes, and then for 30 minutes at 170° C. The product crystallized to a white mass on cooling below 40° C. It had the formula $$(MeO)_3Si(CH_2)_3\overset{Me}{\overset{|}{N}}-\overset{O}{\overset{\|}{C}}-\overset{Me}{\overset{|}{N}}(CH_2)_3Si(OMe)_3$$

EXAMPLE 4

9.7 g. of the methoxysilane of Example 2 was mixed with 92.1 g. of a dimethylsiloxane of the average formula $$HO(\overset{Me_2}{\overset{|}{Si}}O)_{12}H$$

on a rotating wheel for 2 hours in the presence of a trace of propylsilylamine as a catalyst. The resulting copolymer had the average formula

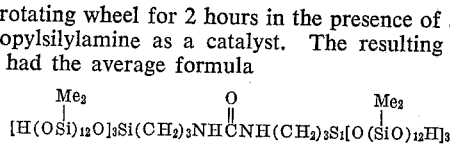

An emulsion (1) was prepared by mixing 20 g. of a mixture of 40 percent by weight of the above copolymer and 60 percent by weight of trimethyl-endblocked methylhydrogensiloxane of about 25 cs. viscosity, 3 g. of a mixture of 75 percent by weight toluene and 25 percent by weight perchloroethylene, 10 g. of a polyvinyl alcohol emulsifier and 17 g. of water. The ingredients were mixed on a homogenizer.

6.3 g. of emulsion (1) was mixed with 7.5 g. of ethyleneurea-formaldehyde resin, 2.2 g. of a 50 percent by weight solution of zinc nitrate hexahydrate containing 5 percent by weight acetic acid, 3.4 g. of an emulsion containing 4 percent by weight dibutyl tin diacetate and 18.2 percent by weight zinc octoate, and sufficient water to make 100 g. total composition. The ingredients were added together in the order listed and stirred after each addition.

80 x 80 cotton print cloth was padded with this composition on a 3-roll padder to give about 80 percent by weight emulsion pickup. The treated fabric was air dried and then heated two minutes at 350° F. The spray rating, percent water absorption and ml. of water penetration was determined on the fabric and various samples were then subjected to washing in a Najort reciprocating washer. In each case the material was washed 40 minutes in 160° F. water with soap and soda ash and then given 4 hot rinses with 120° F. water and one cold rinse. In all cases a water softener was used. The washed material was dried and the spray rating, water penetration and percent absorption were determined after each washing as shown below:

Table I

| Spray rating | | | | Percent water absorption | | | | Ml. of water penetrating fabric | | | |
|---|---|---|---|---|---|---|---|---|---|---|---|
| *0 | 1 | 3 | 5 | 0 | 1 | 3 | 5 | 0 | 1 | 3 | 5 |
| 100 | 70 | 80 | 70+ | 3 | 36 | 48 | 56 | 7 | 15 | 21 | 25 |

*The numerals represent the number of washings before testing.

EXAMPLE 5

This example shows various methods of applying the compositions to cellulosic fabrics.

TREATMENT 1

.25 g. of a solution of 25 percent by weight of $[O_{3/2}Si(CH_2)_3NH]_2C=O$ in water-methanol solvent was diluted with 99.75 g. of water. Cotton fabric was immersed in this solution. The fabric was then air dried and cured two minutes at 350° F.

The fabric was then immersed in a treating bath which was made as follows: An emulsion was prepared by mixing 20 g. of a mixture of 60 percent by weight of a trimethyl-endblocked methylhydrogensiloxane fluid and 40 percent by weight of a hydroxylated dimethylsiloxane fluid; 3 g. of a toluene-perchloroethylene solvent; 10 g. of polyvinyl alcohol and 17 g. of water. 4.7 g. of this emulsion was mixed with 7.5 g. of ethyleneurea-formaldehyde resin, 1.1 g. of zinc nitrate hexahydrate, .6 g. of a silicone catalyst emulsion containing 4 percent by weight dibutyl tin diacetate and 18 percent by weight zinc octoate and sufficient water to make 100 g. of treating bath.

The cloth was then air dried and heated for two minutes at 350° F. The spray rating of the cotton was then determined and the samples were then washed as shown in Example 4 and the spray rating determined after the washings as shown in the table below.

TREATMENT 2

Cotton cloth was immersed in an emulsion prepared by mixing 1.88 g. of a 40 percent emulsion of a copolymer of 7.9 percent by weight

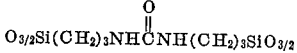

$$O_{3/2}Si(CH_2)_3NH\overset{O}{\overset{\|}{C}}NH(CH_2)_3SiO_{3/2}$$

and 92.1 percent by weight dimethylsiloxane, with sufficient water to make 100 g. total emulsion. The cloth was then dried and heated as above and the sample was then immersed in a treating bath containing 2.8 g. of a 40 percent emulsion of a trimethyl-endblocked methyl hydrogen siloxane fluid, 7.5 g. of ethylene urea-formaldehyde resin, 1.1 g. of zinc nitrate and .6 g. of silicon catalyst emulsion and sufficient water to make 100 g. of treating bath. The cotton cloth was then dried and cured as above and tested as shown in the table below.

TREATMENT 3

Cotton cloth was immersed in a mixture of .06 g. of [O$_{3/2}$Si(CH$_2$)$_3$NH]$_2$C=O, 4.7 g. of a 40 percent by weight emulsion of a mixture of 60 percent by weight of a trimethyl-endblocked methyl hydrogen polysiloxane and 40 percent by weight of a hydroxylated dimethylsiloxane, 7.5 g. of ethylene urea-formaldehyde resin, 1.1 g. zinc nitrate and .6 g. silicone catalyst emulsion and sufficient water to make the total weight 100 g. The cotton was cured as shown above and tested as shown below.

TREATMENT 4

Cotton cloth was immersed in a bath consisting of 1.88 g. of a 40 percent emulsion of a copolymer of 7.9 percent by weight [O$_{3/2}$Si(CH$_2$)$_3$NH]$_2$C=O and 92.1 percent by weight of dimethylsiloxane, 2.8 g. of a 40 percent emulsion of trimethylsilyl-endblocked methylhydrogenpolysiloxane fluid, 7.5 g. of ethyleneurea-formaldehyde resin, 1.1 g. zinc nitrate, .6 g. silicone catalyst emulsion and sufficient water to make the bath 100 g. The cotton was then dried and cured above and tested as shown below.

| Treatment | Spray rating | | | |
|---|---|---|---|---|
| | 0 | 1 | 3 | 5 |
| 1 | 100 | 80 | 50 | 50 |
| 2 | 100 | 90- | 80 | 70 |
| 3 | 100 | 70 | 70- | 50 |
| 4 | 100 | 80 | 70 | 50 |

EXAMPLE 6

Improved water repellency is obtained when the following siloxanes are substituted in the procedure of Example 4:

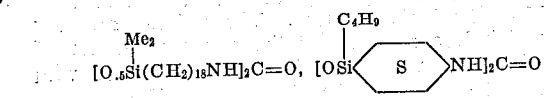

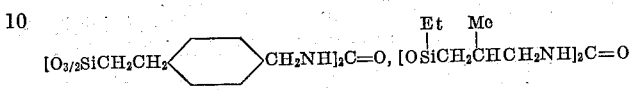

and

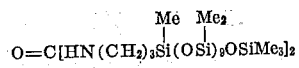

Copolymers of 45 percent by weight

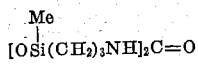

12 percent by weight MeSiO$_{3/2}$
43 percent by weight Me$_2$SiO

EXAMPLE 7

Improved water repellency is obtained when the following crease resistant resins are used in the procedure of Example 4; urea-formaldehyde resin, dimethylol-1,3-propyleneurea, dimethyl-5-methyltetrahydro-s-triazone-2, the trimethylether of trimethylolmelamine and

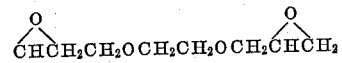

EXAMPLE 8

When 2 mols of the following silanes are reacted with one mol of urea in accordance with the procedure of Example 1 the following products are obtained.

| Silane | Product |
|---|---|
| Me$_3$SiCH$_2$ĊHCH$_2$NH$_2$ (with Me on CH) | [Me$_3$SiCH$_2$ĊHCH$_2$NH]$_2$C=O (with Me on CH) |
| (HCO)$_2$Si(CH$_2$)$_{18}$NH$_2$ (with O= and Ph) | [(HCO)$_2$Si(CH$_2$)$_{18}$NH]$_2$C=O (with O= and Ph) |
| MeCOSiCH$_2$CH$_2$—⟨ ⟩—CH$_2$NH$_2$ (with O= and Et$_2$) | [MeCOSiCH$_2$CH$_2$—⟨ ⟩—CH$_2$NH]$_2$C=O (with O= and Et$_2$) |
| (C$_4$H$_9$O)$_2$Si—⟨S⟩—⟨S⟩—NH$_2$ | [(C$_4$H$_9$O)$_2$Si—⟨S⟩—⟨S⟩—NH]$_2$C=O |
| (MeOCH$_2$CH$_2$O)$_2$SiCH$_2$CH$_2$—⟨S⟩—NH$_2$ (with CH=CH$_2$) | [(MeOCH$_2$CH$_2$O)$_2$SiCH$_2$CH$_2$—⟨S⟩—NH]$_2$C=O (with CH=CH$_2$) |
| C$_4$H$_9$(OCH$_2$CH$_2$)$_2$OSi(CH$_2$)$_3$NH (with Me, C$_4$H$_9$, Ph) | [C$_4$H$_9$(OCH$_2$CH$_2$)$_2$OSi(CH$_2$)$_3$N]$_2$C=O (with Me, C$_4$H$_9$, Ph) |
| (EtCO)$_3$Si—⟨ ⟩—CH$_2$NH$_2$ (with O=) | [(EtCO)$_3$Si—⟨ ⟩—CH$_2$NH]$_2$C=O (with O=) |

EXAMPLE 9

When the hydrolyzable products of Example 5 are hydrolyzed with water, the following siloxanes are obtained:

$$[O\overset{Ph}{\underset{|}{Si}}(CH_2)_{18}NH]_2C=O \quad (5)$$

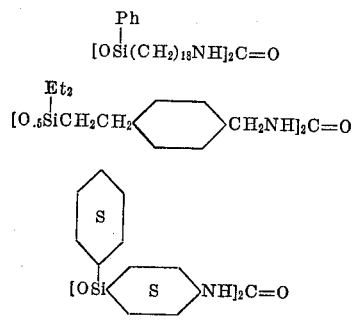

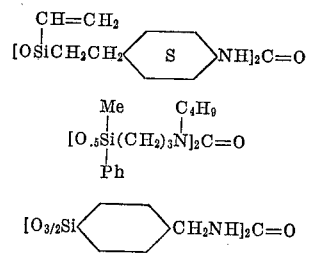

$$[O_{.5}\overset{Me}{\underset{Ph}{Si}}(CH_2)_3\overset{C_4H_9}{\underset{|}{N}}]_2C=O$$

$$[O_{3/2}Si\langle\phantom{x}\rangle CH_2NH]_2C=O \quad (10)$$

EXAMPLE 10

When the following silanes are cohydrolyzed with (A)  $$[MeO\overset{Me_2}{\underset{|}{Si}}(CH_2)_3NH]_2C=O$$

the following copolymers are obtained:

| Silane | Copolymer |
|---|---|
| $CF_3CH_2CH_2\overset{Me_2}{\underset{|}{Si}}OMe$ | $[CF_3CH_2CH_2\overset{Me_2}{\underset{|}{Si}}O\overset{Me_2}{\underset{|}{Si}}(CH_2)_3NH]_2C=O$ |
| $H\overset{Et_2}{\underset{|}{Si}}OMe$ | $[H\overset{Et_2}{\underset{|}{Si}}O\overset{Me_2}{\underset{|}{Si}}(CH_2)_3NH]_2C=O$ |
| $C_{18}H_{37}\overset{Me_2}{\underset{|}{Si}}OMe$ | $[C_{18}H_{37}\overset{Me_2}{\underset{|}{Si}}O\overset{Me_2}{\underset{|}{Si}}(CH_2)_3NH]_2C=O$ |

| Mixture of— | Copolymer of— |
|---|---|
| 5 mol percent $(EtO)_4Si$ | 5 mol percent $SiO_2$ |
| 10 mol percent $C_2H_3\overset{Me_2}{\underset{|}{Si}}OMe$ | 10 mol percent $C_2H_3\overset{Me_2}{\underset{|}{Si}}O_{.5}$ |
| 70 mol percent PhMeSiO | 70 mol percent PhMeSiO |
| 15 mol percent (A) | 15 mol percent $[O_{.5}\overset{Me_2}{\underset{|}{Si}}(CH_2)_3NH]_2$—C=O |
| 5 mol percent ⟨S⟩—Si(OMe)₃ | 5 mol percent ⟨S⟩—SiO₃/₂ |
| 10 mol percent $CF_3$⟨⟩$\overset{Me}{\underset{|}{Si}}(OMe)_2$ | 10 mol percent $CF_3$⟨⟩$\overset{Me}{\underset{|}{Si}}O$ |
| 50 mol percent $Cl(CH_2)_3\overset{Et}{\underset{|}{Si}}(OMe)_2$ | 50 mol percent $Cl(CH_2)_3\overset{Et}{\underset{|}{Si}}O$ |
| 45 mol percent (A) | 45 mol percent $[O_{.5}\overset{Me_2}{\underset{|}{Si}}(CH_2)_3\text{—}NH]_2C=O$ |
| 10 mol percent $Br$⟨⟩$Si(OMe)_3$ | 10 mol percent $Br$⟨⟩$SiO_{3/2}$ |
| 40 mol percent $Br$⟨S⟩$\overset{Me}{\underset{|}{Si}}(OMe)_2$ | 40 mol percent $Br$⟨S⟩$\overset{Me}{\underset{|}{Si}}O$ |
| 50 mol percent (A) | 50 mol percent $[O_{.5}\overset{Me_2}{\underset{|}{Si}}(CH_2)_3NH]_2C=O$ |
| 5 mol percent ⟨⟩⟨⟩Si(OMe)₃ | 5 mol percent ⟨⟩⟨⟩SiO₃/₂ |
| 10 mol percent ⟨⟩Si(OMe)₃ | 10 mol percent ⟨⟩SiO₃/₂ |
| 85 mol percent (A) | 85 mol percent $[O_{.5}\overset{Me_2}{\underset{|}{Si}}(CH_2)_3NH]_2C=O$ |
| 5 mol percent Me⟨⟩Si(OMe)₃ | 5 mol percent Me⟨⟩SiO₃/₂ |

| Mixture of— | Copolymer of— |
|---|---|
| 10 mol percent 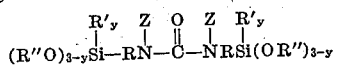 | 10 mol percent 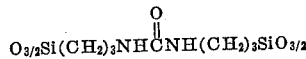 |
| 10 mol percent Cl₅C₆Si(OMe)₂ | 10 mol percent Cl₅C₆SiO 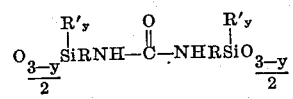 |
| 75 mol percent (A) | 75 mol percent [O.₅Si(CH₂)₃NH]₂C=O |

That which is claimed is:

1. An organosilicon compounds of the formula

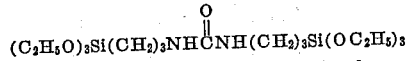

in which

R″ is selected from the group consisting of acyl and alkyl radicals of from 1 to 4 inclusive carbon atoms and radicals of the formula —(CH₂CH₂O)ₙR‴ in which n is an integer from 1 to 2 inclusive and R‴ is an alkyl radical of from 1 to 4 inclusive carbon atoms, R′ is a monovalent hydrocarbon radical of less than 7 carbon atoms, y has an average value of from 0 to 3 inclusive and R is a divalent hydrocarbon radical free of aliphatic unsaturation of from 3 to 18 inclusive carbon atoms which is attached to N through a nonaromatic carbon atom and Z is selected from the group consisting of hydrogen and lower alkyl radicals.

2. An organosilicon compound of the formula (C₂H₅O)₃Si(CH₂)₃NHCNH(CH₂)₃Si(OC₂H₅)₃
         ‖
         O 3. An organosilicon composition of the formula (CH₃O)₃Si(CH₂)₃NHCNH(CH₂)₃Si(OCH₃)₃
         ‖
         O 4. A siloxane in which at least one siloxane unit is of the formula

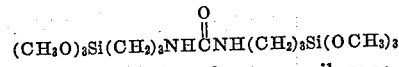

in which y has an average value from 0 to 2 inclusive,

Z is selected from the group consisting of hydrogen and lower alkyl radicals,

R′ is a monovalent hydrocarbon radical of less than 7 carbon atoms,

R is a divalent hydrocarbon radical free of aliphatic unsaturation of from 3 to 18 inclusive carbon atoms which is attached to N through a nonaromatic carbon atom, any remaining siloxane units in said siloxane being of the formula

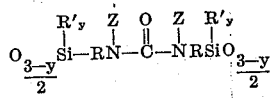

in which

B is selected from the group consisting of hydrogen atoms, monovalent hydrocarbon radicals, and monovalent halohydrocarbon radicals of 1 to 18 inclusive carbon atoms and a has an average value from 0 to 3 inclusive.

5. A siloxane of the unit formula

O₃/₂Si(CH₂)₃NHCNH(CH₂)₃SiO₃/₂
           ‖
           O

6. A siloxane copolymer consisting of from 2 to 50 percent by weight of siloxane units of the formula

in which y has an average value from 0 to 2 inclusive and

R is a divalent hydrocarbon radical free of aliphatic unsaturation of from 3 to 18 inclusive carbon atoms which is attached to N through a nonaromatic carbon atom and R′ is a lower alkyl radical and from 50 to 98 percent by weight siloxane of the formula $(CH_3)_b SiO_{\frac{4-b}{2}}$ in which b has an average value from 1.75 to 2.1 inclusive.

7. A siloxane copolymer consisting of from 2 to 50 percent by weight of siloxane of the formula O₃/₂Si(CH₂)₃NHCNH(CH₂)₃SiO₃/₂
           ‖
           O and from 50 to 98 percent by weight dimethylsiloxane.

References Cited by the Examiner

UNITED STATES PATENTS

| 2,735,791 | 2/56 | Peyrot et al. | 260—46.5 |
| 2,857,430 | 10/58 | Applegath et al. | 260—448.8 |
| 2,907,782 | 10/59 | Pike | 260—448.2 |

LEON J. BERCOVITZ, *Primary Examiner.*

DONALD E. CZAJA, *Examiner.*

UNITED STATES PATENT OFFICE
CERTIFICATE OF CORRECTION

Patent No. 3,208,971                      September 28, 1965

John W. Gilkey et al.

It is hereby certified that error appears in the above numbered patent requiring correction and that the said Letters Patent should read as corrected below.

Column 3, line 68, for "H$^2$SiO" read -- H$_2$SiO --; column 4, lines 6 and 7, for "resins, pyrimidone-formaldehyde resins and epoxide resins," read -- urea-formaldehyde resin, alkyleneurea-formaldehyde resins, --; column 5, lines 24 and 25, the formula should appear as shown below instead of as in the patent:

same column 5, lines 74 and 75, the formula should appear as shown below instead of as in the patent:

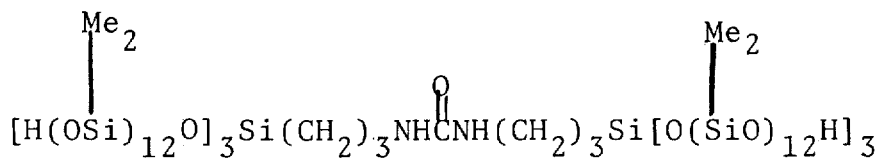

Signed and sealed this 25th day of October 1966.

(SEAL)
Attest:

ERNEST W. SWIDER                      EDWARD J. BRENNER
Attesting Officer                   Commissioner of Patents